United States Patent
Wang et al.

(10) Patent No.: US 8,609,183 B2
(45) Date of Patent: Dec. 17, 2013

(54) METHOD FOR MAKING SULFUR-GRAPHENE COMPOSITE MATERIAL

(75) Inventors: Li Wang, Beijing (CN); Xiang-Ming He, Beijing (CN); Jian-Jun Li, Beijing (CN); Jian-Wei Guo, Beijing (CN); Wen-Ting Sun, Beijing (CN); Jian-Guo Ren, Beijing (CN)

(73) Assignees: Tsinghua University, Bejing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/545,170

(22) Filed: Jul. 10, 2012

(65) Prior Publication Data

US 2013/0171339 A1  Jul. 4, 2013

(30) Foreign Application Priority Data

Dec. 28, 2011  (CN) .......................... 2011 1 0447350

(51) Int. Cl.
*B05D 5/12* (2006.01)

(52) U.S. Cl.
USPC .......................................... 427/113; 427/115

(58) Field of Classification Search
USPC ................................................ 427/113, 115
See application file for complete search history.

(56) References Cited

U.S. PATENT DOCUMENTS

| 2,636,831 | A | * | 4/1953 | Carney .......................... 427/213 |
| 7,491,378 | B2 | * | 2/2009 | Yamamoto et al. ........... 423/518 |
| 2011/0247312 | A1 | * | 10/2011 | Bookbinder et al. ......... 60/39.12 |
| 2012/0088154 | A1 | * | 4/2012 | Liu et al. ...................... 429/213 |
| 2012/0177995 | A1 | * | 7/2012 | Sun et al. ................... 429/231.8 |
| 2012/0214068 | A1 | * | 8/2012 | Dai et al. ..................... 429/224 |

OTHER PUBLICATIONS

Recent progress in the key materials for Li-S polymer secondary batteries, Wan et al., Chinese Battery Industry, vol. 11, No. 5, 2006, p. 291-p. 295.

* cited by examiner

*Primary Examiner* — Brian K Talbot
(74) *Attorney, Agent, or Firm* — Altis Law Group, Inc.

(57) ABSTRACT

A method for making sulfur-graphene composite material is disclosed. In the method, a dispersed solution including a solvent and a plurality of graphene sheets dispersed in the solvent is provided. A sulfur-source chemical compound is dissolved into the dispersed solution to form a mixture. A reactant, according to the sulfur-source chemical compound, is introduced to the mixture. Elemental sulfur is produced on a surface of the plurality of graphene sheets due to a redox reaction between the sulfur-source chemical compound and the reactant, to achieve the sulfur-graphene composite material. The sulfur-graphene composite material is separated from the solvent.

17 Claims, 4 Drawing Sheets

METHOD FOR MAKING SULFUR-GRAPHENE COMPOSITE MATERIAL

CROSS-REFERENCE TO RELATED APPLICATIONS

This application claims all benefits accruing under 35 U.S.C. §119 from China Patent Application No. 201110447350.9, filed on Dec. 28, 2011, in the China Intellectual Property Office, the contents of which are hereby incorporated by reference.

BACKGROUND

1. Technical Field

The present disclosure relates to methods for making sulfur based composites. The present disclosure particularly relates to a method for making sulfur-graphene composites.

2. Description of Related Art

The goal of lithium ion battery development is high energy density, safety, and sustainability. This is typically determined by the current progress of available materials. Currently, elemental sulfur has the highest theoretical capacity and theoretical specific energy density of all known cathode materials for rechargeable lithium ion batteries. Combined with abundant resources and low cost, sulfur shows great potential as the cathode for the next generation of high performance lithium batteries.

However, previous studies of Li—S batteries with organic electrolytes revealed problems including low cycling stability and poor cycle life, because of the insulating nature of sulfur and the volume change during cycling of the cell. Composite conducting agents, such as porous carbon, carbon nanotubes, and graphene with sulfur have been attempted to improve the conductivity of the cathode material. To composite the conducting agents with sulfur, elemental sulfur is sublimed at a high temperature to produce sulfur vapor, and then the sulfur vapor is deposited on a surface of the conducting agents. However, it is difficult to control the morphology and particle size of the deposited sulfur, which results in an unsatisfactory cycling performance of the Li—S battery.

What is needed, therefore, is to provide a method for making sulfur-graphene composite material having relatively high cycling performance in a lithium ion battery.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
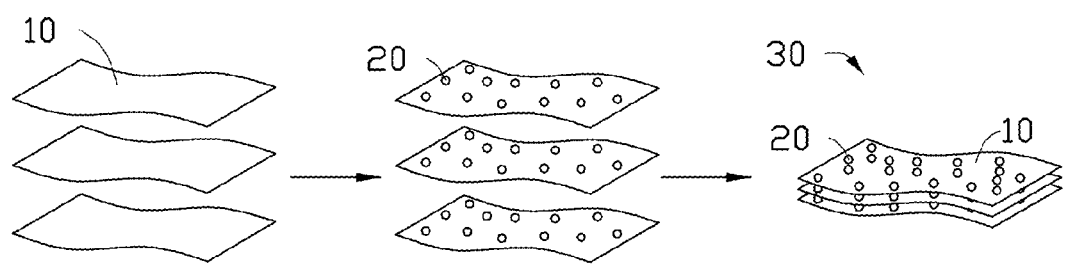
FIG. 1 is a schematic view of a method for making sulfur-graphene composite material.

Referring to FIG. 1, one embodiment of a method for making sulfur-graphene composite material includes:

S11, providing a dispersed solution comprising a solvent and a plurality of graphene sheets 10 dispersed in the solvent;

S12, dissolving a sulfur-source chemical compound into the dispersed solution to form a mixture; and S13, introducing a reactant to the mixture, producing elemental sulfur 20 on a surface of the graphene sheets 10 due to a redox reaction between the sulfur-source chemical compound and the reactant, to achieve the sulfur-graphene composite material; and S14, separating the sulfur-graphene composite material from the solvent.

Graphene is a carbonaceous material composed of carbon atoms densely packed in a two dimensional honeycomb crystal lattice. In the present application, the graphene can be pure graphene or functionalized graphene. The pure graphene only includes carbon atoms without other functional groups joined thereto. The functionalized graphene may include the pure graphene as a basal-plane and one or more functional groups joined to carbon atoms of the pure graphene. The functionalized graphene can be covalently or non-covalently functionalized (such as due to electrovalent bonds, hydrogen bonds, and/or π-π bonds). The one or more functional groups can consist of, for example, oxygen containing functional groups, nitrogen containing functional groups, phosphorus containing functional groups, sulfur containing functional groups, hydrocarbon containing functional groups, and halogen containing functional groups. One kind of the functionalized graphene is graphene oxide, whose functional groups are oxygen containing functional groups. The oxygen containing functional groups can be such as carboxyl groups, carbonyl groups, hydroxyl groups, ester groups, aldehyde groups, and epoxy groups. The single layer of graphene can solely exist, however layers of graphene can be laminated together. In the present disclosure, the graphene sheet 10 includes 1-10 layers of graphene laminated together. In one embodiment, the graphene sheet 10 includes 1-3 layers of graphene laminated together.

In the step S11, the plurality of graphene sheets 10 can be dispersed in the solvent uniformly by mechanically stirring or ultrasonically agitating, to form the dispersed solution. The graphene sheets 10 can be separately and uniformly suspended in the solvent. The solvent can be a liquid medium for the dispersion of the graphene sheets 10 and the redox reaction. The solvent should be able to allow dispersion of the graphene sheets 10 and dissolving of the sulfur-source chemical compound and should not dissolve the elemental sulfur 20 generated from the redox reaction. In one embodiment, the solvent is able to completely evaporate. Ingredients of the solvent can have a small molecular weight. In some embodiments, the solvent can be water or non-carbonate-ester organic solvent, such as ethanol, ether, methanol, acetone, dichloroethane, chloroform, or combinations thereof. The concentration of the graphene sheets 10 in the dispersed solution can be equal to or less than 5% (weight percentage).

The graphene oxide can be prepared by a conventional method such as the Brodie method, Hummers method, and Staudenmaier method.

In one embodiment, the graphene oxide is prepared by a method including:

mixing graphite, concentrated sulfuric acid, and sodium nitrate, to form a mixed reagent;

stirring of the mixed reagent at about 0° C. to about 4° C. while introducing potassium permanganate (KMnO$_4$) to the mixed reagent;

stirring the mixed reagent at about 35° C.;

adding water to the mixed reagent during stirring of the mixed reagent while increasing the temperature of the mixed reagent to about 98° C. to about 100° C.;

introducing a water solution of H$_2$O$_2$ to the mixed reagent to achieve the graphene oxide; and separating the graphene oxide from the mixed reagent.

In another embodiment, the graphene oxide can be prepared by first forming graphite oxide, and ultrasonically agitating the graphite oxide in water to form graphene oxide and disperse the graphene oxide in the solvent simultaneously.

In the step S12, the sulfur-source chemical compound can be dissolved in the solvent of the dispersed solution. The sulfur-source chemical compound can be a chemical compound containing sulfur. The sulfur-source chemical compound can be a salt, an acid, or an oxide. For example, the sulfur-source chemical compound can be thiosulfates, thiocarbonates, sulfites, metal sulfides (M$_x$S$_y$), sulfur dioxide, sulfur trioxide, hydrogen sulfide, thiosulphuric acid, thiocarbonic acid, sulfurous acid, or combinations thereof. The thiosulfate can be at least one of sodium thiosulfate, potassium thiosulfate, and ammonium thiosulfate. The thiocarbonate can be at least one of sodium thiocarbonate, potassium thiocarbonate, and ammonium thiocarbonate. The metal sulfide can be at least one of sodium sulfide, potassium sulfide, and lithium sulfide.

In the step S13, the reactant is selected according to the sulfur-source chemical compound. The reactant is capable of having a redox reaction with the sulfur-source chemical compound to form solid elemental sulfur. The solid elemental sulfur cannot be dissolved in the solvent.

In some embodiments, the reactant can be an oxidant or reductant of the sulfur-source chemical compound. The oxidant or reductant of the sulfur-source chemical compound can be added into the mixture to react with the sulfur-source chemical compound and form the solid elemental sulfur. The oxidant or reductant of the sulfur-source chemical compound is capable of reducing or oxidizing the sulfur-source chemical compound into the solid elemental sulfur.

In another embodiment, the reactant can be an agent to induce a disproportionate reaction of the sulfur-source chemical compound. During the disproportionate reaction of the sulfur-source chemical compound, the solid elemental sulfur and another substance containing sulfur are formed.

In one embodiment, the step S13 is processed at a tender reaction condition, such as at a relatively low temperature (e.g., about 10° C. to about 60° C.), to avoid an affection of the structure and property of the graphene.

The amount of the sulfur-source chemical compound and the amount of the reactant are dependent on the amount of the elemental sulfur 20 that needs to be deposited on the surface of the graphene sheets 10. Once the amount of the elemental sulfur 20 is determined, the amount of the sulfur-source chemical compound and the amount of the reactant can be calculated by the chemical equation of the redox reaction of the step S13 according to the desired amount of the elemental sulfur 20. A weight percentage of the elemental sulfur 20 in the sulfur-graphene composite material can be in a range from about 10% to about 45%, and in one embodiment is about 20% to about 30%.

The sulfur-source chemical compound can be dissolved in the solvent of the dispersed solution. After the step S12, the graphene sheets 10 are coexisted with the sulfur-source chemical compound in the solvent. The graphene has relatively high surface energy. Therefore, once the liquid phase of the sulfur-source chemical compound is transformed into the solid phase of the elemental sulfur 20 due to the redox reaction, the formed solid phase of the elemental sulfur 20 is captured (i.e., absorbed) by the graphene sheets 10, and attaches to the surfaces of the graphene sheets 10. The elemental sulfur 20 can be formed on the surface of each of the graphene sheets 10. The formed elemental sulfur 20 can be combined with the graphene sheet 10 directly through strong interactions, such as a π bond. The in situ formed elemental sulfur 20 can be in particle form. The growing of the particle size of the elemental sulfur 20 can be restrained, to form small sized elemental sulfur 20 uniformly distributed on the surface of the graphene sheet 10. The particle size of the elemental sulfur 20 can be in a range from about 10 nanometers to about 1 micron. In one embodiment, the particle size of the elemental sulfur 20 can be in a range from about 30 nanometers to about 100 nanometers. In step S13, the mixture can be stirred to sufficiently contact the formed elemental sulfur 20 to the graphene sheets 10.

The sulfur in the sulfur-source chemical compound can have a relatively high valence, such as +6, +4, and +2, or can have a relatively low valence, such as −2. If the sulfur in the sulfur-source chemical compound has a relatively high valence, the reactance can be the reductant of the sulfur-source chemical compound, to reduce the high valence sulfur in the sulfur-source chemical compound to the elemental sulfur 20. If the sulfur in the sulfur-source chemical compound has a relatively low valence, the reactance can be the oxidant of the sulfur-source chemical compound, to oxide the low valence sulfur in the sulfur-source chemical compound to the elemental sulfur 20. The sulfur-source chemical compound can be used as an oxidant or a reductant of itself in the disproportionation reaction of the sulfur-source chemical compound.

In one embodiment, the sulfur-source chemical compound is a thiosulfate, such as sodium thiosulfate, and the reactant can be an acid, such as at least one of hydrochloric acid, oxalic acid, acetic acid, and nitric acid. The disproportionation reaction can occur between the sulfur-source chemical compound and the acid. If the sulfur-source chemical compound is sodium thiosulfate and the acid is hydrochloric acid, the redox reaction can be represented by the equation:

$$2HCl+Na_2S_2O_3=2NaCl+S\downarrow+SO_2\uparrow+H_2O \qquad (1).$$

In another embodiment, the sulfur-source chemical compound is a metal sulfide, such as sodium sulfide, the reactant can be the oxidant of the metal sulfide, such as sulfur dioxide or sulfur trioxide dissolved in water. If the sulfur-source chemical compound is sodium sulfide and the reactant is sulfur dioxide, the sulfur dioxide is introduced to the mixture in a gas form, and the redox reaction can be represented by the equation:

$$5SO_2+2Na_2S+2H_2O=3S\downarrow+4NaHSO_3 \qquad (2).$$

In another embodiment, when the sulfur-source chemical compound is sulfur dioxide dissolved in water, the reactant can be the reductant of the sulfur dioxide, such as sodium sulfide, and the redox equation can also be represented by equation (2).

In another embodiment, sulfurous acid or sulfites can also have a redox reaction with hydrogen sulfide to form elemental sulfur 20.

In the step S14, the graphene sheets 10 having elemental sulfur 20 deposited thereon can be separated from the solvent by filtering, washing with deionized water, and drying. The separating step can be relatively gentle to not disturb the self-assembly of the graphene sheets 10. For example, heating and stirring can be avoided in the step S14. In one embodiment, the mixture can be centrifugalized or filtrated to separate the sulfur-graphene composite material from the solvent.

Referring to FIG. 1, after in situ formed the elemental sulfur particles 20 on the graphene sheets 10 and during the separating step, the plurality of graphene sheets 10 can be self-assembled to form a stable stacked structure 30. The stacked structure 30 includes a plurality of graphene sheets 10 stacked and stably combined together, a plurality of elemental sulfur particles 20 uniformly located between adjacent two layers of graphene sheets 10.

Another embodiment of a method for making sulfur-graphene composite material includes:

S21, providing a dispersed solution comprising a solvent and graphene oxide sheets dispersed in the solvent;

S22, dissolving a sulfur-source chemical compound into the dispersed solution to form a mixture; and S23, introducing a reactant to the mixture, producing elemental sulfur 20 and hydrogen sulfide due to a redox reaction between the sulfur-source chemical compound and the reactant, reducing the graphene oxide sheets by the hydrogen sulfide to the graphene sheets 10, to achieve the sulfur-graphene composite material; and S24, separating the sulfur-graphene composite material from the solvent.

The steps S21 to S24 are similar to the steps S11 to S14 in the above described embodiment. However, in the steps S21 to S24, the graphene is graphene oxide, and in the step S23, the hydrogen sulfide is formed with the elemental sulfur 20 due to the redox reaction. More specifically, the hydrogen sulfide and the elemental sulfur 20 can be formed by the same chemical reaction, or by two simultaneously occurred chemical reactions. The hydrogen sulfide is a reducing gas. The graphene oxide sheets can be reduced to the unoxidized graphene sheets 10 by the hydrogen sulfide during the depositing of the elemental sulfur 20 on the surface of the unoxidized graphene sheets. The oxygen containing functional groups of the graphene oxide sheets can oxidize the hydrogen sulfide into elemental sulfur 20. More specifically, the oxygen containing functional groups, such as carboxyl groups, carbonyl groups, hydroxyl groups, ester groups, aldehyde groups, and epoxy groups, can react with the hydrogen sulfide to form elemental sulfur 20 and water. The elemental sulfur 20 can be combined with the graphene sheets 10 by carbon-sulfur (C—S) bonds.

In one embodiment, the sulfur-source chemical compound is a thiosulfate, such as sodium thiosulfate, and the reactant can be an acid. The sodium thiosulfate can react with the acid to form hydrogen sulfide. If the sulfur-source chemical compound is sodium thiosulfate and the acid is hydrochloric acid, the redox reaction can be represented by the equation:

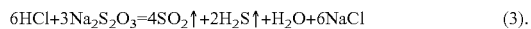

$$6HCl+3Na_2S_2O_3=4SO_2\uparrow+2H_2S\uparrow+H_2O+6NaCl \quad (3).$$

The reaction of equation (3) can occur simultaneously with the reaction of equation (1) having a part of thiosulfate reduced into the elemental sulfur 20 and another part of thiosulfate reduced into the hydrogen sulfide.

In another embodiment, the sulfur-source chemical compound is a metal sulfide, the reactant is sulfur dioxide or sulfur trioxide, and the metal sulfide can react with the sulfur dioxide or sulfur trioxide to form the hydrogen sulfide. If the metal sulfide is sodium sulfide, the reactant is sulfur dioxide, and the redox reaction can be represented by the equation:

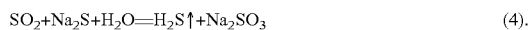

$$SO_2+Na_2S+H_2O=H_2S\uparrow+Na_2SO_3 \quad (4).$$

The reaction of equation (4) can occur simultaneously with the reaction of equation (2) having a part of sodium sulfide oxidized into the elemental sulfur 20 and another part of sodium sulfide reacted with the sulfur dioxide to form the hydrogen sulfide.

In the above described embodiments, the elemental sulfur 20 is in situ formed on the surface of the graphene sheets 10. The particle size of the elemental sulfur 20 is relatively small and uniform. The elemental sulfur 20 can be firmly attached to the surface of the graphene sheets 10, to control the morphology of the elemental sulfur 20 on the surface of the graphene sheets 10. The sulfur-graphene composite material can be used as a cathode active material of a lithium ion battery. The volume change of the lithium ion battery during the charge and discharge can be decreased due to the small and uniform particle size of the elemental sulfur 20. The conductivity of the cathode active material can be increased due to the deposition of the elemental sulfur 20 on the surface of the graphene sheets 10. Therefore, the cycling performance of the lithium ion battery can be increased. Additionally, the high surface energy of the graphene sheets 10 can be adopted to form a stacked structure by a gentle separating step, the step S4. The stacked structure can further decrease the unwanted dissolution of the elemental sulfur 20 in the electrolyte of the lithium ion battery, to further increase the cycling performance.

EXAMPLE 1

Figure 2:
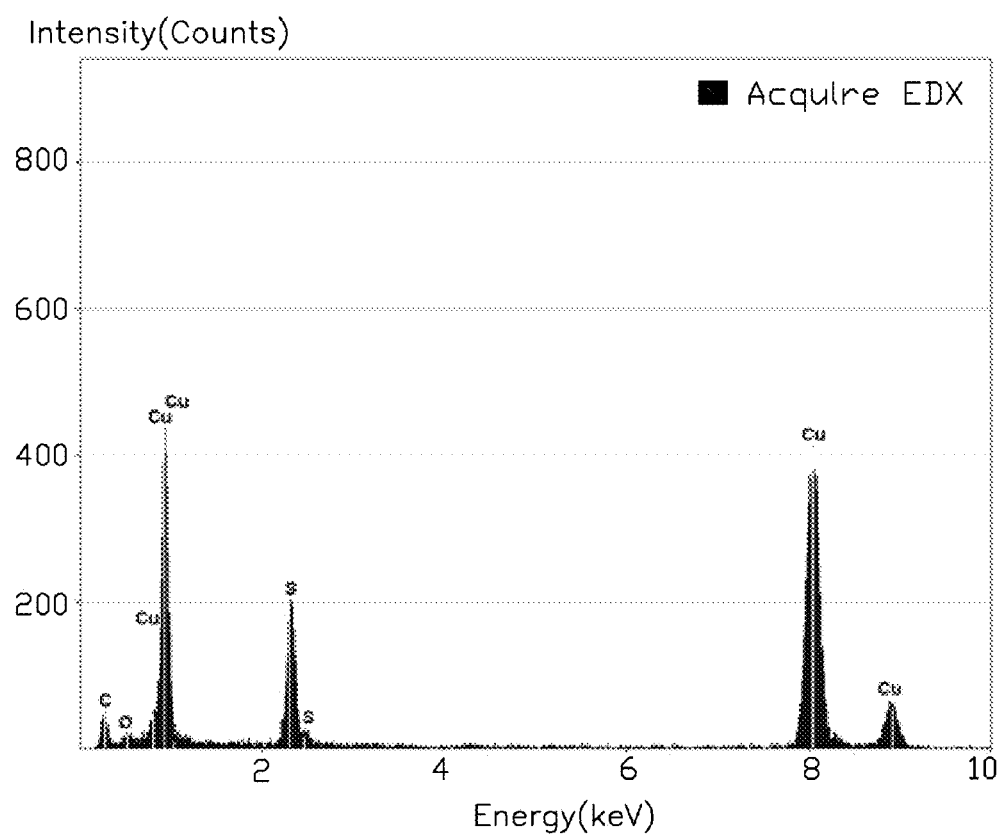
FIG. 2 shows an Energy Dispersive Spectrometer (EDS) spectrum for a formed sulfur-graphene composite material.
Figure 3:
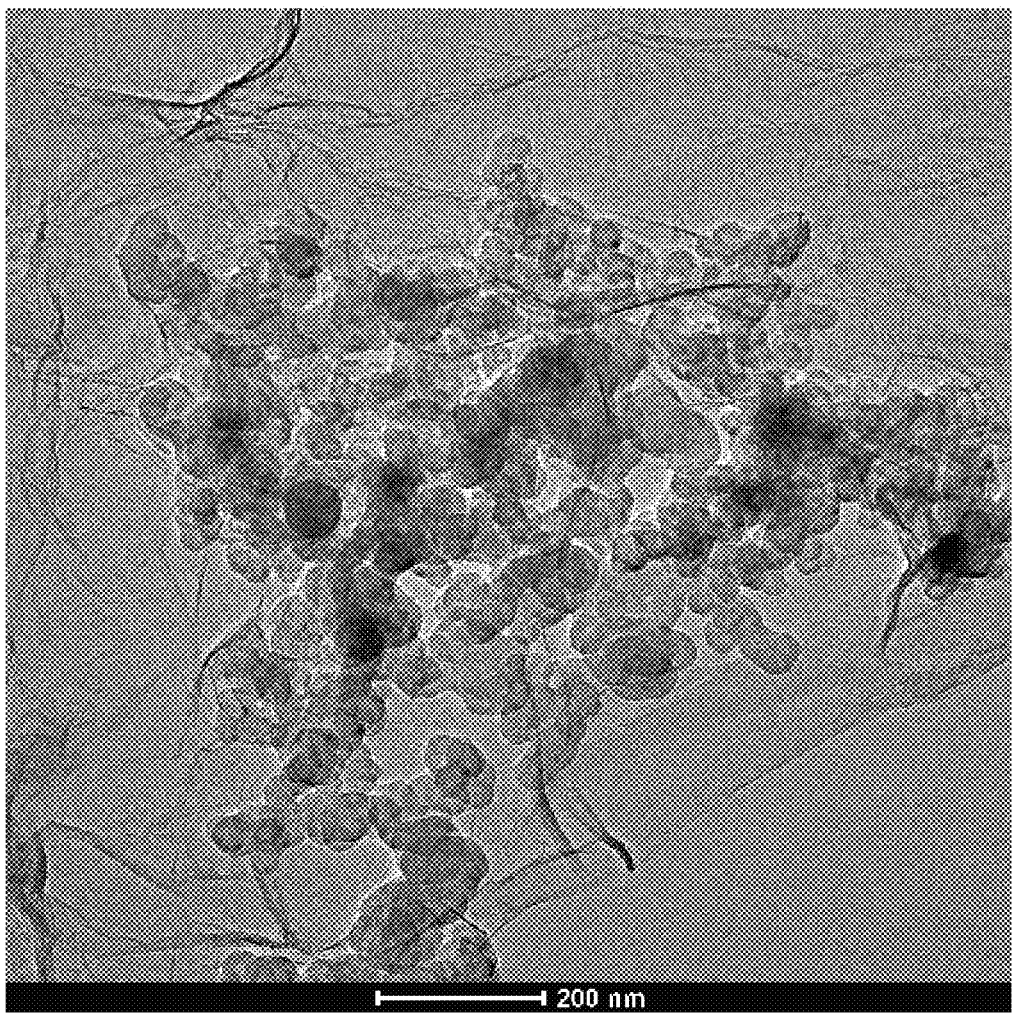
FIG. 3 shows a Transmission Electron Microscope (TEM) image of a formed sulfur-graphene composite material.

In Example 1, brown powder of graphite oxides is ultrasonically agitated in water to form dark brown powder of graphene oxides stably dispersed in the water, which is used as the dispersed solution. The power for the ultrasonically agitation is about 100 W. The size of the formed graphene oxides is about 10 microns to about 100 microns. The graphene oxides can be stood in the water for 24 hours without precipitation. The weight percentage of the graphene oxides is about 0.5% in the water. About 0.90741 g sodium thiosulfate is added in 100 ml dispersed solution, to form a mixture. The mixture is stirred and 6 ml hydrochloric acid with a weight concentration of 0.5% is slowly added to the mixture. White-grey floccules can be seen in the mixture, which is the elemental sulfur. The white-grey floccule is centrifugalized from the water and washed by deionized water twice, and dried at about 60° C., to achieve the sulfur-graphene composite material. Referring to FIG. 2, the sulfur-graphene composite material by analyzed by EDS. In the EDS spectrum, the Cu peak corresponds to the copper substrate which is used to support the sulfur-graphene composite material. The relatively strong S peak and C peak can be found in the EDS spectrum. The O peak is weak, which means the graphene oxides are reduced to unoxidized graphene. Referring to FIG. 3, the achieved sulfur-graphene composite material is observed by TEM. The elemental sulfur particles are distributed on the surface of the graphene. The elemental sulfur particles are nanosize in scale, which is about 30 nanometers to about 100 nanometers, having a relatively uniform size.

Figure 4:
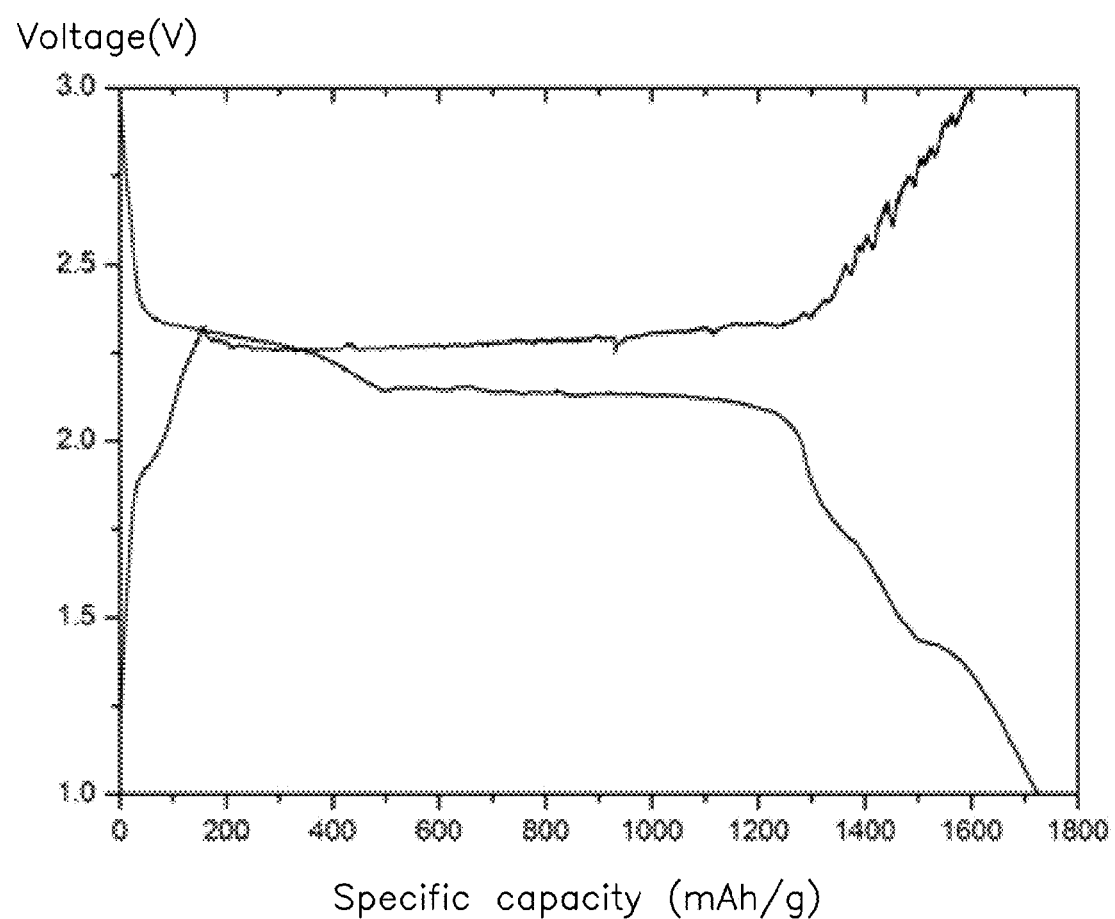
FIG. 4 shows a charge-discharge curve of a lithium ion battery using the formed sulfur-graphene composite material.

The sulfur-graphene composite material is used as a cathode active material and mixed with a conducting agent and a binder to form a cathode material paste. The cathode material paste is coated on a cathode current collector to form a cathode electrode. Lithium metal is used as an anode electrode. The lithium ion battery is assembled to test the cycling performance Referring to FIG. 4, from the chare-discharge curve of the lithium ion battery, it can be seen that the specific capacity is about 1600 mAh/g. The lithium ion battery has a period of relatively stable charge-discharge and relatively small impedance, and thus has a relatively good cycling performance.

EXAMPLE 2

The dispersed solution is formed by the same method in Example 1. The weight concentration of the graphene oxide is about 0.5%. About 0.7 g sodium sulfide is added in about 100 ml dispersed solution to form a mixture. $SO_2$ gas is continuously introduced in the mixture until the redox reaction is complete. The white-grey floccule is filtered and washed by deionized water twice, and dried at about 60° C., to achieve the sulfur-graphene composite material.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making sulfur-graphene composite material comprising steps:
   providing a dispersed solution comprising a solvent and a plurality of graphene sheets dispersed in the solvent;
   dissolving a sulfur-source chemical compound into the dispersed solution to form a mixture; and
   forming the sulfur-graphene composite material in the solvent by producing elemental sulfur on a surface of the plurality of graphene sheets due to a redox reaction between the sulfur-source chemical compound and the reactant, by introducing a reactant according to the sulfur-source chemical compound into the mixture; and
   separating the sulfur-graphene composite material from the solvent.

2. The method of claim 1, wherein the sulfur-source chemical compound is selected from the group consisting of thiosulfates, thiocarbonates, sulfites, metal sulfides ($M_xS_y$), sulfur dioxide, sulfur trioxide, hydrogen sulfide, thiosulphuric acid, thiocarbonic acid, sulfurous acid, and combinations thereof.

3. The method of claim 2, wherein the thiosulfates are selected from the group consisting of sodium thiosulfate, potassium thiosulfate, ammonium thiosulfate, and combinations thereof.

4. The method of claim 3, wherein the reactant is selected from the group consisting of hydrochloric acid, oxalic acid, acetic acid, nitric acid, and combinations thereof.

5. The method of claim 2, wherein the metal sulfide is selected from the group consisting of sodium sulfide, potassium sulfide, lithium sulfide, and combinations thereof.

6. The method of claim 5, wherein the reactant is selected from the group consisting of sulfur dioxide, sulfur trioxide, and combinations thereof.

7. The method of claim 1, wherein the reactant is an oxidant or reductant of the sulfur-source chemical compound.

8. The method of claim 1, wherein the reactant is an agent to induce a disproportionation reaction of the sulfur-source chemical compound.

9. The method of claim 1, wherein the separating step comprises a step of centrifugalizing or filtrating the sulfur-graphene composite material from the solvent.

10. The method of claim 1, wherein during the separating step, the plurality of graphene sheets are self-assembled to form a stable stacked structure, the stable stacked structure comprises a plurality of graphene sheets stacked and stably combined together, and a plurality of elemental sulfur particles uniformly located between adjacent layers of graphene sheets.

11. The method of claim 1, wherein the elemental sulfur is combined with the surface of the plurality of graphene sheets through a $\pi$ bond.

12. The method of claim 1, wherein a particle size of the elemental sulfur is in a range from about 10 nanometers to about 1 micron.

13. The method of claim 1, wherein the plurality of graphene sheets comprises graphene oxides.

14. The method of claim 13, wherein hydrogen sulfide is formed to reduce the graphene oxides into unoxidized graphene sheets when introducing the reactant.

15. The method of claim 14, wherein the elemental sulfur is combined with the unoxidized graphene sheets by carbon-sulfur bonds.

16. A method for making sulfur-graphene composite material comprising steps:
   providing a dispersed solution comprising a solvent and a plurality of graphene oxide sheets dispersed in the solvent;
   dissolving a sulfur-source chemical compound into the dispersed solution to form a mixture; and
   introducing a reactant to the mixture to produce elemental sulfur and hydrogen sulfide due to one redox reaction between the sulfur-source chemical compound and the reactant;
   reducing the graphene oxide sheets into unoxidized graphene sheets by the hydrogen sulfide produced by the redox reaction, to achieve the sulfur-graphene composite material in the solvent; and
   separating the sulfur-graphene composite material from the solvent.

17. The method of claim 16, wherein the elemental sulfur is combined with the unoxidized graphene sheets by carbon-sulfur bonds.

* * * * *